Patented Oct. 8, 1946

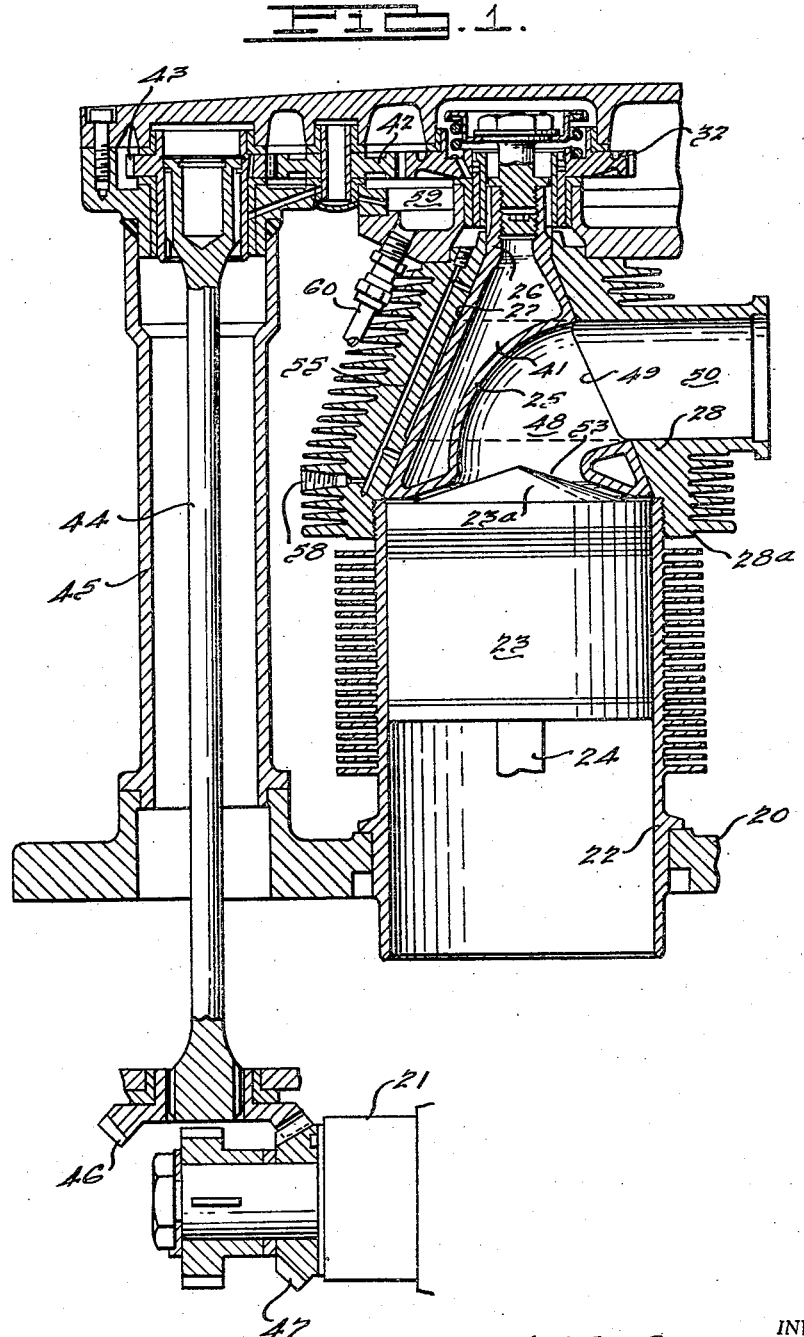

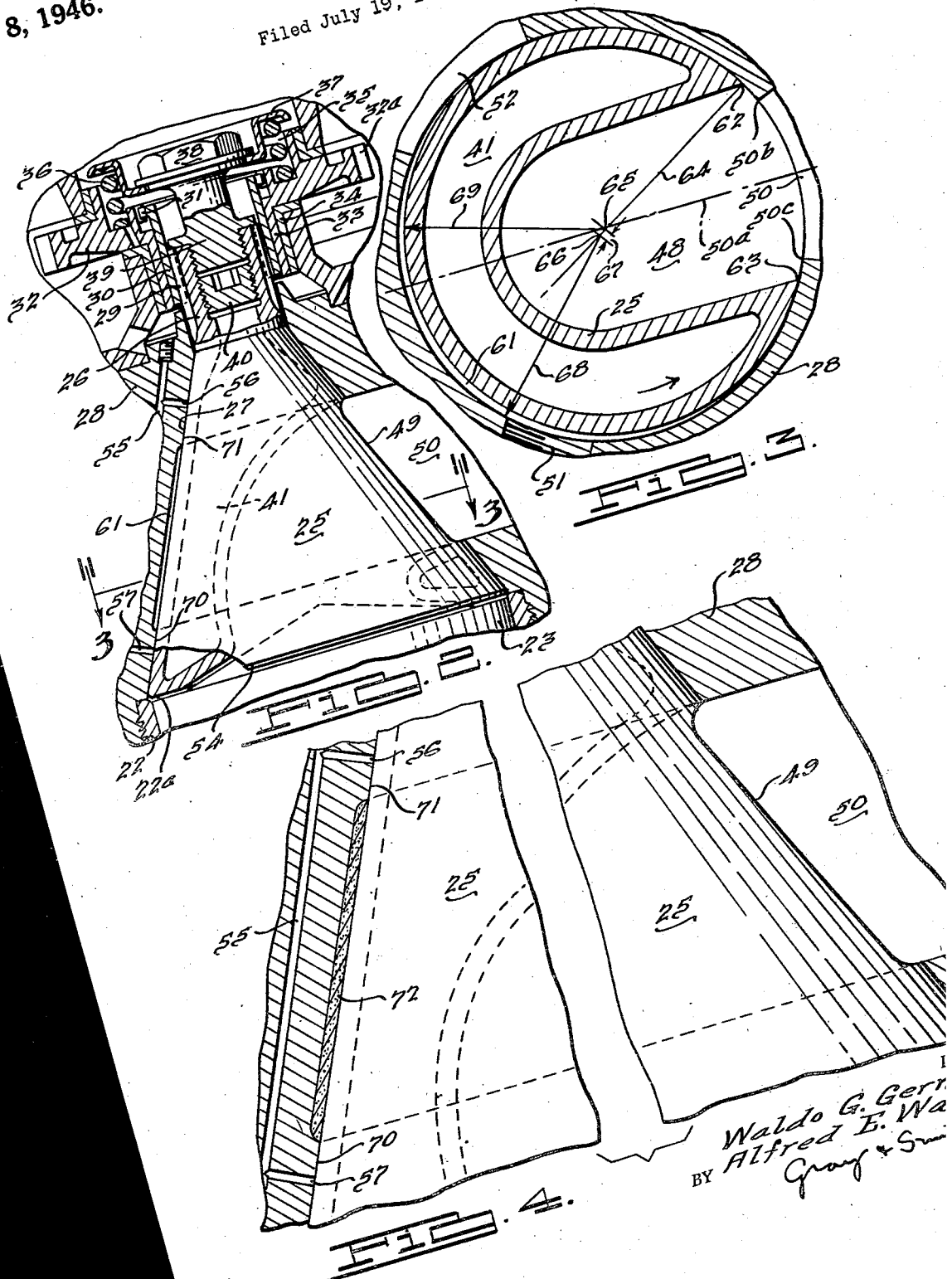

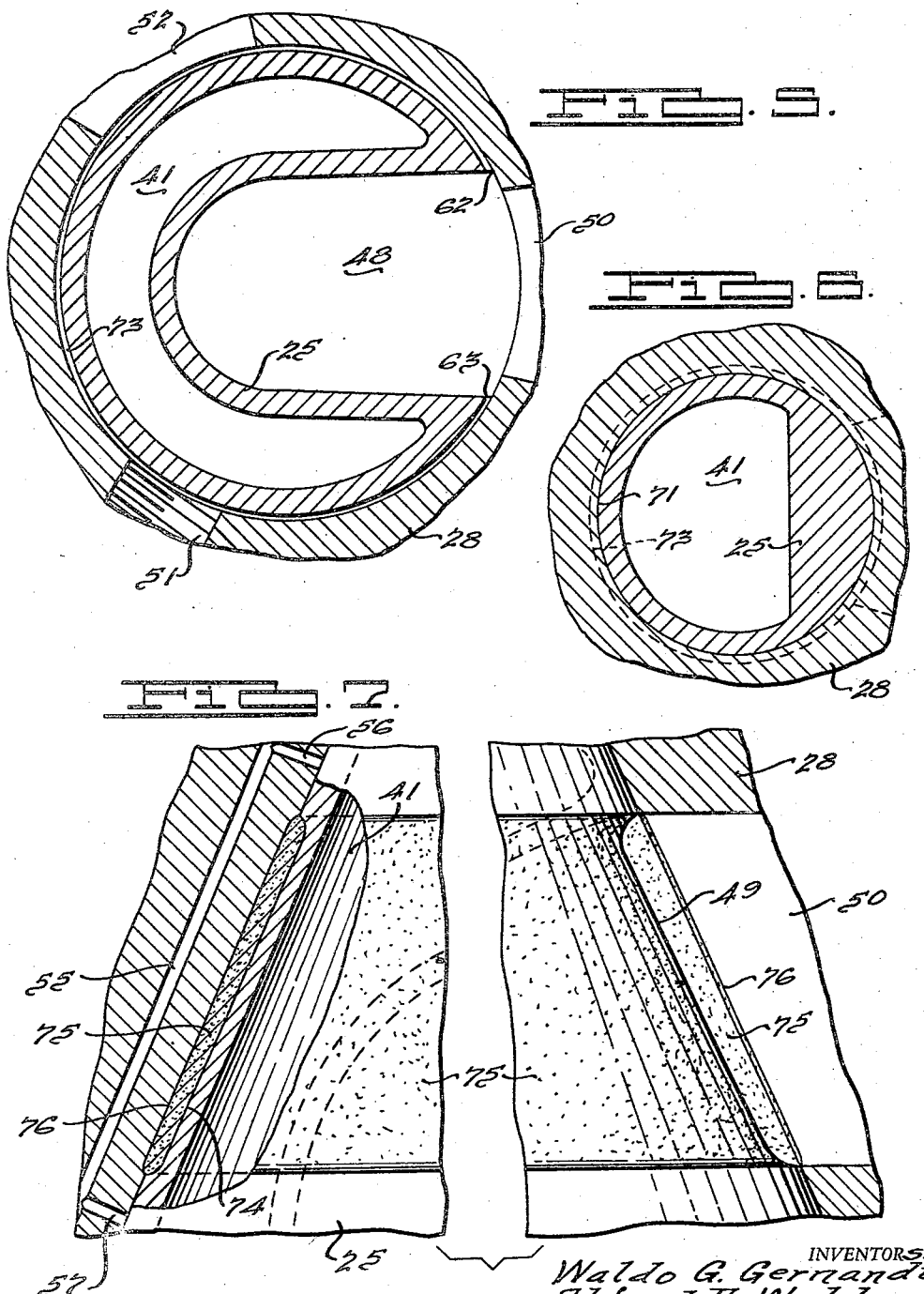

2,409,034

UNITED STATES PATENT OFFICE 2,409,034

ENGINE

Waldo G. Gernandt and Alfred E. Walden, Detroit, Mich., assignors to Briggs Manufacturing Company, Detroit, Mich., a corporation of Michigan Application July 19, 1943, Serial No. 495,260

23 Claims. (Cl. 123—80)

This invention relates to internal combustion engines and particularly to engines of the class which are provided with rotatable valves, preferably although not necessarily rotating continuously in one direction, for controlling the intake and firing of the combustible charge or fuel mixture and for exhausting the products of combustion. The present invention relates particularly to the valve mechanism of such engines and in its broader aspects is applicable to engines in which the valve rotates continuously in one direction or rotates in an oscillatory manner.

The present application is a continuation-in-part of our application Serial No. 475,757, filed February 13, 1943, now Patent No. 2,387,143, October 16, 1945.

In the present preferred embodiments of this invention the rotatable valve is mounted in the cylinder head and is formed with substantially all or at least the major portion of the combustion chamber. Moreover, in the illustrated embodiments the valve or rotor is substantially frusto-conical in construction having an opening or port in the side of the valve adapted to communicate with an intake or exhaust passage, or both as the case may be, and also an opening or port at the inner end or bottom of the valve leading to the cylinder. With the exception of these ports the combustion chamber is otherwise entirely enclosed or housed within the walls of the valve member or rotor. The combustible charge within the combustion chamber of the valve is fired preferably by spark ignition although in its broader aspects the invention is not considered to be so limited.

Serious problems have been encountered heretofore in the production of a satisfactory engine of the foregoing kind, particularly because of the inability to obtain sufficient power output or maintain efficient and sustained high speed performance, such as required for engines used in aircraft. Some of the principal problems or difficulties have been in connection with the lubrication of the rotary valve, satisfactory control and reduction of oil consumption, elimination of gas leakage and consequent power loss during the power and compression strokes of the piston, and the provision of adequate properly lubricated bearings of simplified nature for the valve in order to prevent reduction in power output due to excessive friction, scoring and wear of the valve.

An object of the present invention is to overcome some or all of the foregoing difficulties by providing an improved internal combustion engine of the rotatable valve type which will have improved power characteristics, will be capable of meeting exacting requirements in respect to sustained operation, and will have longer life while maintaining a more nearly constant performance rating during such long usage.

A further object of the invention is to provide an engine of the foregoing class having improved bearing means for the valve and improved means for sealing the exhaust opening particularly at the time of firing the charge in the valve combustion chamber.

Another object of the invention is to eliminate elaborate or relatively complicated bearing arrangements for the valve and to provide, instead, a simple and efficient bearing means for the valve which will overcome difficulties heretofore encountered due to severe wedging action or thrust of the valve against its seat, tending to impair seriously the oil film between the surfaces of the valve and its bearing seat in the cylinder head and frequently resulting in seizing and scoring of the valve.

A still further object of the invention is to provide an improved internal combustion engine of the generally frusto-conical valve type in which a relief area is provided between the valve and cylinder head, and preferably intermediate the ends of the valve, whereby a material reduction is provided in the area of the valve subject to high bearing loads during operation.

Another object of the invention is to reduce the area of the valve subject to bearing loads by relieving in improved manner the generally frusto-conical wall of the cylinder head within which the valve rotates.

Still another object of the invention is to provide improved means for reducing the friction and consequent wear on the valve over a substantial area thereof by utilizing a carbon formation within a relief area in the wall of the valve or cylinder head or both thereby producing in effect a self-lubricated surface having the additonal function of providing a seal against the leakage of gases.

Another object of the invention is to provide an engine having a generally frusto-conical valve formed with a combustion chamber and in which the adjacent tapering wall of the cylinder head is relieved centrally around the valve so as to provide spaced bearing areas or bands at the smaller and larger ends thereof designed to receive the principal bearing loads during operation.

A further object of the invention is to improve the operation and performance characteristics of the engine by circumferentially relieving the wall of the cylinder head adjacent the valve, or circumferentially relieving both the valve and cylinder head walls, and in such manner as to reduce friction at critical times and provide more effective sealing of the gases against leakage, the accomplishment of these results being aided materially by the formation of a carbon layer in the relief area not only assisting in effecting the seal but also providing an anti-friction medium between adjacent surfaces of the valve and cylinder head not requiring lubrication and hence having the advantage of reducing oil consumption.

Other objects of this invention will appear in the following description and appended claims, reference being had to the accompanying drawings forming a part of this specification wherein like reference characters designate corresponding parts in the several views.

Fig. 1 is a fragmentary sectional elevation illustrating a portion of a multi-cylinder engine embodying the present invention.

Fig. 2 is an enlarged fragmentary sectional elevation illustrating particularly the associated cylinder head and rotary valve structure together with a portion of the valve driving means shown in Fig. 1.

Fig. 3 is an enlarged section taken substantially through lines 3—3 of Fig. 2 looking in the direction of the arrows.

Fig. 4 is an enlarged fragmentary sectional elevation, in part similar to Fig. 2, illustrating the carbon formation in the relief area of the cylinder head.

Fig. 5 is a view similar to Fig. 3 illustrating a modified relief formation in the cylinder head.

Fig. 6 is a fragmentary horizontal section taken through the valve and cylinder head at a point immediately above the relief area in the embodiment of Fig. 5.

Fig. 7 is a view somewhat similar to Fig. 2 illustrating the carbon formation in the relief area in both the cylinder head and valve.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings we have illustrated, by way of example, one embodiment of the invention as applied to an internal combustion engine of the spark-ignition type designed particularly for the power plant of an aircraft. The invention may obviously be utilized in connection with engines for other purposes, such as automotive, marine and industrial engines. For most uses the engine is of the multicylinder type. However, for the purposes of simplicity a single cylinder unit of the engine is illustrated in the present embodiment, it being understood that the remaining cylinders of the engine are identical to the structure herein shown and described.

Referring to Fig. 1, the present engine comprises a suitable crankcase 20 within which is mounted a crankshaft 21 supported in bearings according to conventional practice. A cylinder 22 is secured rigidly in the crankcase and has its lower or inner end projecting thereinto. Mounted to reciprocate within the cylinder is a piston 23 adapted to be connected in the usual manner by a connecting rod 24 to the crankshaft 21.

In the present engine the combustion chamber of the cylinder is formed principally within a rotor or rotary valve member 25, this member comprising a frusto-conical body arranged immediately above the piston when at the top of its stroke. The valve 25 is provided at its outer end with a cylindrical stem 26. The rotor 25 fits within a substantially correspondingly shaped frusto-conical cavity 27 in an upper cylinder head member 28.

The rotor 25 is driven through the medium of the stem 26 which is positively connected to a driving gear in such manner as to permit slight relative axial and radial movement between the driving gear and the rotor. Accordingly, the stem 26 has a longitudinal splined connection 29 with a sleeve 30 which in turn has a longitudinal splined or toothed connection 31 at its upper end with a driving gear 32, the gear having a depending cylindrical hub or sleeve 33 interposed between the sleeve 30 and a bearing or bushing 34. The gear 32 has an annular recess 35 at its outer side adapted to receive and house a compression spring 36. This spring is engaged by a retainer 37 which is clamped to the valve stem 26 by means of a nut 38 provided with a shank 39 threaded into a tapped hole in the stem 26. The valve member 25 is formed with a cooling chamber 41 extending entirely around the combustion chamber of the valve member. This cooling chamber is adapted to receive any suitable cooling medium, such for example as metallic sodium, which is sealed into the chamber by means of a screw plug 40 threaded into the tapped hole in the valve stem 26.

From the foregoing it will be seen that the valve 25 may be rotated from the gear 32 through the medium of the splined connections 29 and 31 which permit slight relative axial and radial movement of the valve during operation. The valve is yieldingly held outwardly against the tapered wall 27 of the valve cavity or recess in the head by means of the spring 36. The driving gear 32 is provided with gear teeth 32a meshing with the teeth of a gear 42 driven by a gear 43 secured to the upper end of a tower shaft 44 extending through a tubular housing 45. Secured to the lower end of the tower shaft is a gear 46 meshing with a gear 47 pinned to the crankshaft 21.

The rotor 25 is formed with a combustion chamber 48 which preferably forms substantially all of the combustion space at the time of firing when the piston 23 is in its position of maximum compression. The piston is preferably formed with a tapered end 23a which is adapted to project a slight distance into the combustion chamber 48, as shown in Fig. 1, and the bottom of the valve is tapered so as to correspond substantially to the shape of the upper crowned or tapered portion 23a of the piston.

In the particular embodiments herein illustrated it will be seen that the rotor or valve 25 has a single port 49 in its side communicating with the combustion chamber 48 and adapted to register in succession with an exhaust conduit 50, an intake conduit 52 and a spark plug at location 51. In these embodiments, therefore, the valve or rotor 25 is driven at one-half engine or crankshaft speed, the direction of rotation of the valve being indicated by the arrow in Fig. 3. The driving mechanism, above described and shown in the drawings, is illustrative of a suitable mechanism by which one of a plurality of rotary valves 25 of a corresponding plurality of cylinders 22 may be driven from the crankshaft 21.

The spark plug location 51 is in the form of a tapped hole for reception of a spark plug of any suitable type.

The present engine preferably utilizes a fuel injection system, although it will be understood that the invention is not so limited and that a carburetor may be employed for supplying the fuel charge to the combustion chamber 48 when the side port 49 of the valve registers with the intake conduit or passage 52. Where a fuel injection system is used, fuel may be injected through the medium of any suitable fuel injector (not shown) into the air stream in the passage or conduit 52 so that the rotor will be supplied with the proper combustible mixture at the time of ignition, namely when port 49 of the rotor registers with the spark plug at location 51.

In addition to the side port 49 the valve or rotor 25 is provided at the bottom or inner end thereof with a centrally located port 53 adapted to communicate with the outer end of the cylinder 22. As previously stated, the bottom surface of the rotor surrounding the port 53 is tapered and during operation the valve is normally held outwardly within the tapered or frustoconical cavity 27 of the cylinder head by the compression spring 36. The cylinder head 28 is formed with a depending internally threaded skirt 28a into which the upper threaded end of the cylinder 22 is adapted to be screwed for attaching the head and cylinder together.

As illustrated particularly in Fig. 2, the lower annular edge of the valve member 25 is provided with an inwardly directed taper or bevel 54 and the upper edge of the cylinder 22 is provided with a corresponding tapered or bevelled edge 22a adjacent but spaced from the bevelled edge 54 of the valve member. A clearance is thus provided between the bevelled edge 54 of the valve and the bevelled edge 22a of the cylinder so as normally to avoid frictional engagement between these parts during operation.

Improved lubricating means is provided for the rotor or rotatable valve member 25 and it will also be understood that suitable lubricating means is provided for the other operating parts of the engine so as to maintain an oil film on all surfaces requiring lubrication. In the present instance the valve member 25 at its outer tapered surface is lubricated by means of ducts arranged above and below the exhaust and intake passages 50 and 52. As illustrated in Figs. 1 and 2, the cylinder head is provided with a passage or conduit 55 extending parallel to the tapered wall of the valve member, there being two passages or ducts 56 and 57 leading from the passage 55 to the wall of the valve member at points above and below the circumferential area corresponding to the height of the side port 49 in the valve. Lubricating oil under pressure from a suitable pump is supplied to the passage or conduit 55 by means of a passage 58 extending through the wall of the cylinder head and connected by a pipe line to the oil pump or other pressure feed system. Oil is also supplied under pressure to the upper end of the valve and associated operating parts, there being a sump 59 in the cylinder head within which the oil collects. This sump is connected by return line 60 to the crankcase of the engine.

In the present embodiments of the invention the principal bearing loads between the rotor or valve 25 and the head 28 are taken substantially entirely at two localities entirely above and below the side port 49. Referring to the embodiment of Figs. 2 to 4 inclusive, the cylinder head 28 in this instance is provided with an annular relief area 61 extending around the central or intermediate portion of the valve and having a height preferably corresponding to the height of the side port 49, as clearly shown in Fig. 2. This relief area may be formed by cam grinding so as to provide a circumferentially tapering relief of diminishing depth around the valve. This relief area is at the side of the cylinder head cavity 27 opposite to the exhaust port 50 with its greatest depth, however, at that side of the central line 50a of the port 50 more remote from the intake passage 52. The relief is ground eccentrically with its center of curvature located on an imaginary line 64 extending from the leading edge 62 of the port 49 through the axis 65 of the valve and the corresponding center of the cylinder head cavity 27, the line 64 being determined when the valve member is arranged in its full exhaust position as shown in Fig. 3. The maximum depth of the relief area 61 is predetermined. Assuming that it is desired that this maximum relief or clearance be approximately two to five thousandths of an inch over and above the normal running clearance, a point 66 on the line 64 is determined which is two to five thousandths of an inch from the center or axis 65, and this point 66 forms the center of curvature of the relief 61 ground in the cylinder head. The center of curvature 66 of the relief area is thus spaced on the line 64 from the center of curvature 65 of the valve as shown at 67. The radius of the relief 61 in the cylinder head, having its center of curvature at 66, is shown by the line 68 in Fig. 3. The radius of the valve member is shown by the line 69 with its center of curvature at point 65. The relief area thus formed diminishes in depth in opposite directions and terminates at one end at a considerable distance from the edge 50b of the exhaust passage 50 while at its opposite end it terminates relatively close to the opposite edge 50c of the exhaust passage 50. Between the edge 50b of the exhaust passage and the intake passage 52, there is thus provided a circumferential area which is substantially unrelieved, or approximately so, so that at the time of firing of the fuel charge an effective seal is provided against the leakage of gases.

By providing the relief band 61 centrally of the valve 25 it will be seen that the principal bearing loads during operation, and particularly at the time of explosion, will be taken in the annular tapering areas 70 and 71 of the valve which have a normal operating clearance with respect to the bearing cavity 27 in the head.

The primary purpose of the relief area 61 is to provide for the building-up of a carbon formation 72 within this area, see Fig. 4. As the engine operates, carbon immediately accumulates in the relief area 61 and very shortly this formation of carbon 72 completely fills the relief area and thereby produces a bearing surface for the valve 25 which is of an anti-friction character, of self-lubricating nature and requiring no direct lubrication from an outside source. From this construction it will, therefore, be seen that throughout the area of the valve represented by the relief area or band 61, there is provided an excellent bearing surface for the valve member by virtue of the induced carbon formation 72 which has the additional advantage of assisting in sealing the valve against leakage of gases at the time of maximum compression and also at the time of firing. Consequently, it is only necessary to provide direct lubrication, as by means of ducts 56 and 57, at the bearing areas above and below the area 61, and hence considerable economies in oil consumption are achieved due to the fact that no film of oil is required at the locality of the area 61 which would be burned off at the time of firing.

Referring to the embodiment illustrated in Figs. 5 and 6, there is provided in this instance a circumferential relief area 73 in the cylinder head corresponding in location and height to the relief area 61 in the embodiment of Fig. 2. The relief 73, however, is uniform in depth around the cylinder head from one edge of the exhaust port 50 to the opposite edge thereof. As in the case of the relief area or band 61 the relief area 73 will also during operation of the engine fill up with a formation of carbon providing not only a seal against leakage of gases but also an excellent bearing surface not requiring any separate lubrication. The construction of the engine embodying the features of Figs. 5 and 6 is otherwise the same as that previous described, and as in the previous embodiment lubrication of the valve is only necessary at points above and below the area 73 and produced by means of oil under pressure directed through conduit 55 into the ducts 56 and 57.

In the present engine the valve member 25 may be advantageously formed of cast iron and the cylinder head formed of a suitable aluminum alloy. The areas of the valve member above and below the reliefs 61 and 73 subject to high bearing loads are, however, adequately cooled due to the construction and arrangement of the cooling chamber 41 extending entirely around the combustion chamber and containing coolant proximate to these areas which sustain the high bearing loads, as clearly illustrated in Figs. 1 and 2.

In the embodiment illustrated in Fig. 7 the valve member 25 is in this instance provided with a circumferential relief area or band 74 which may be eccentric in nature similar to the eccentric relief 61 in the embodiment of Fig. 3 and formed in substantially similar manner as by cam grinding. During operation of the engine carbon immediately builds up in the relief area 74 and eventually fills this relief completely thereby providing an excellent bearing surface as well as a seal similar to that above described in connection with Fig. 4. During continued operation of the engine the carbon formation in the relief area 74 will build up increasingly and wear a corresponding relief area 76 in the surface of the aluminum head 28. Thus, as illustrated in Fig. 7, complementary relief areas or bands 74 and 76 will be formed in the valve and cylinder head with a layer of carbon therebetween providing an extremely effective seal and bearing surface requiring no lubrication. Although in Fig. 7 the relief area 74 is shown as being ground eccentrically in the manner shown in Fig. 3, yet it will be understood that this area may be formed with a relief of uniform depth in the manner shown in Figs. 5 and 6 in which instance the carbon formation 75 will be of uniform depth entirely around the valve. An important advantage of this construction, in addition to those advantages above set forth, resides in the fact that oil consumption will be reduced to a minimum, since there will be no oil film within the area represented by the relief 74 which would otherwise be subject to burning off at the time of firing of the fuel charge.

Although in the present embodiments of the invention we have utilized conveniently the operation of the engine to form the layer of carbon within the circumferential relief or recessed area in the valve or cylinder head or both and extending in the height, preferably the full height, of the valve side port, yet it will be understood that the carbon formation may be accomplished by other means, it being one of the important features of the invention to provide this carbon bearing and sealing medium for the valve so as to improve the operation of the engine and enable it unnecessary to provide any direct external lubrication for the carbon layer.

The carbon bearing areas in the embodiments of the invention illustrated in the drawings have been shown as continuous and extending a substantial distance around the valve or rotor. However, it will be understood that these areas may be of any predetermined width and may be any number as desired and separated around the valve. For example, a series of relief or recessed areas of predetermined width may be spaced around the valve, either in the valve or head or both, and containing carbon formations which not only provide bearing surfaces between the valve and head but also function to maintain the proper clearance between the valve and head, preventing seizure and scoring of the valve. This is important in the proper operation of the engine since the valve is preferably held tightly at all times against its conical seat by the spring 36 which is of such strength as to overcome the effort exerted during the suction stroke of the piston to unseat the valve.

We claim:

1. In an internal combustion engine, a cylinder head, and a rotatable generally frusto-conical valve therein, the outer wall of said valve and the juxtaposed wall of the cylinder head being relatively relieved to provide a circumferential area of varying clearance between the juxtaposed walls of the cylinder head and valve, said relieved area having a carbon formation therein providing a bearing surface between the valve and cylinder head.

2. In an internal combustion engine, a cylinder head, and a rotatable generally frusto-conical valve therein having a side port, the outer wall of said valve and the juxtaposed wall of the cylinder head being relatively relieved to provide a circumferential area of uniform clearance between the juxtaposed walls of the cylinder head and valve extending substantially the height of said port.

3. In an internal combustion engine, a cylinder head, and a rotatable generally frusto-conical valve therein having a side port, the outer wall of said valve and the juxtaposed wall of the cylinder head being relatively relieved to provide a circumferential area of uniform clearance between the juxtaposed walls of the cylinder head and valve, said relieved area having a carbon formation therein providing a bearing surface between the valve and cylinder head extending substantially the height of said port.

4. In an internal combustion engine, a cylinder head having a port, a rotatable generally frusto-conical valve therein and having a side port adapted to register with said port in the head, said head having a circumferential relieved area at the side of the valve of varying depth terminating short of one edge of said cylinder head port.

5. In an internal combustion engine, a rotatable generally frusto-conical valve having a combustion chamber and a port in the side thereof, a support for said valve within which it rotates, said support having a gas passage and a relieved area of varying depth, the point of greatest depth of said area being at the side of said support opposite to said passage.

6. In an internal combustion engine, a rotatable generally frusto-conical valve having a combustion chamber and a port in the side thereof, a support for said valve within which it rotates, said support having a gas passage and a circumferential relieved area of varying depth opposite said passage.

7. In an internal combustion engine, a rotatable generally frusto-conical valve having a combustion chamber and a port in the side thereof, a support for said valve within which it rotates, said support having a gas passage and a relieved area eccentric with respect to the valve axis and terminating short of the side edges of the passage.

8. In an internal combustion engine, a cylinder, a cylinder head associated therewith and having a generally conical valve cavity, a generally conical valve rotatably mounted in said cavity and having a side port adapted to communicate with a gas passage in the head, said valve also having a combustion chamber and a port at its inner end providing communication between the cylinder and combustion chamber, said cylinder head and valve one thereof having a recessed area of varying depth extending in the height of the valve and containing a layer of carbon providing a bearing medium between the valve and cylinder head within said cavity, and said cylinder head and valve having a lubricated bearing area adjacent said recessed area.

9. In an internal combustion engine, a cylinder head, and a rotatable generally frusto-conical valve therein, the outer tapering wall of said valve having a side port, and said wall and the juxtaposed wall of the cylinder head being relatively reduced to provide a relieved area extending substantially the height of said port and having greater clearance between said juxtaposed walls than the clearance between adjacent juxtaposed portions of the valve and cylinder head walls, said relieved area having a carbon formation therein providing a bearing surface between the valve and cylinder head.

10. In an internal combustion engine, a cylinder head, and a rotatable generally frusto-conical valve therein, said valve having a side port in the outer tapering wall thereof and said wall being reduced to provide a relieved area extending substantially the height of said port and having greater clearance with respect to the juxtaposed wall of the cylinder head than adjacent portions of said valve wall at opposed sides of the relieved area, said relieved area having a carbon formation therein providing a bearing surface between the valve and cylinder head.

11. In an internal combustion engine having a cylinder and cylinder head, a rotatable tapering wall valve therein, said valve having a side port and tapering outer wall portions at opposite sides of said port adapted to have bearing engagement with corresponding walls of the cylinder head, a circumferential area of the valve outer wall intermediate said portions and in the height of said port having greater clearance with respect to the juxtaposed wall of the cylinder head, and a carbon formation in said area providing a bearing surface between the head and valve.

12. In an internal combustion engine, a cylinder head, and a rotatable valve therein having a side port, circumferential bearing areas between the valve and head spaced axially of the valve at opposite sides of said port, means for lubricating said surfaces, and a non-lubricated circumferential layer of carbon forming a bearing surface between the valve and head intermediate said areas and having a width corresponding substantially to the height of said port.

13. In an internal combustion engine, a cylinder head, a rotatable valve therein having a side port, said valve and head one thereof having a recessed area carrying a layer of carbon providing a bearing and sealing medium and having a width extending substantially the height of said port, said valve and head also having lubricated bearing areas at opposite sides of said recessed area and port.

14. In an internal combustion engine, a rotatable generally frusto-conical valve formed therein with a combustion chamber and a side port, a support for said valve within which the valve is adapted to rotate, said support and valve one thereof having a recessed area extending substantially the height of the port and having therein a layer of carbon providing a bearing medium between the valve and support, said support and valve also having lubricated bearing areas at opposite sides of said recessed area and port.

15. In an internal combustion engine, a rotatable valve formed therein with a combustion chamber and a side port, a support for said valve within which the valve is adapted to rotate, said support and valve one thereof having a recessed area extending circumferentially a predetermined distance around the valve substantially the height of said port and having therein a layer of carbon providing a bearing medium between the valve and support, and means for conveying lubricant directly to the side walls of said valve solely at points intermediate the ends of said side walls at opposite sides of said carbon layer and port.

16. In an internal combustion engine, a rotatable valve formed therein with a combustion chamber and a side port, a support for said valve within which the valve is adapted to rotate, said support and valve one thereof having a recessed area extending circumferentially a predetermined distance around the valve substantially the height of said port and having therein a layer of carbon providing a bearing medium between the valve and support, said layer of carbon being free of direct external lubrication and said support and valve having lubricated bearing areas adjacent said recessed area at opposite sides thereof.

17. In an internal combustion engine, a support, a rotatable valve therein having a combustion chamber and a side port, a circumferential bearing area between the valve and head comprising a lubricated portion and a layer of carbon located in a relatively relieved portion of the valve and support, said relieved portion extending substantially the height of the port and said lubricated portion being immediately adjacent thereto.

18. In an internal combustion engine, a support, a rotatable valve therein having a combustion chamber and a side port, a circumferential bearing area between the valve and head comprising a lubricated portion and a layer of carbon located in a relatively relieved portion of the valve and support, said relieved portion varying in depth and said lubricated portion being immediately adjacent thereto.

19. In an internal combustion engine, a cylinder head, a rotatable valve therein having a side port, and a circumferential bearing surface between the valve and head and comprising a lubricated area and a layer of carbon located in a recess in the head at one side of said area, said recess corresponding in height substantially to the height of said port.

20. In an internal combustion engine, a cylinder head, a rotatable generally frusto-conical valve therein having a side port, and a circumferential bearing surface between the valve and head and comprising a lubricated area and a layer of carbon located in a recess in the head at one side of said area, said recess corresponding in width substantially to the height of said port in a direction axially of the valve.

21. In an internal combustion engine, a cylinder head, a rotatable valve therein, and a circumferential bearing area between the valve and head comprising a lubricated portion and a layer of carbon located within a relief in the head, said relief lying intermediate the ends of said bearing area and terminating short thereof.

22. In an internal combustion engine, a cylinder head, a rotatable valve therein having a side port, and a circumferential bearing surface between the valve and head comprising a lubricated area and a layer of carbon located in a recess in the valve at one side of said area, said recess corresponding in width substantially to the height of said port in a direction axially of the valve.

23. In an internal combustion engine, a cylinder head, a rotatable generally frusto-conical valve therein having a side port, and a circumferential bearing surface between the valve and head corresponding at least in height to the height of said port and comprising a lubricated area and a layer of carbon located in a recess in the valve at one side of said area, said recess corresponding in height substantially to the height of said port.

WALDO G. GERNANDT.
ALFRED E. WALDEN.